United States Patent [19]
Stevens

[11] Patent Number: 6,134,989
[45] Date of Patent: Oct. 24, 2000

[54] MULTI-LUG NUT DRIVING DEVICE

[76] Inventor: Gerald Stevens, 543 Pardee Blvd., Browns Mills, N.J. 08015

[21] Appl. No.: 09/243,999

[22] Filed: Feb. 3, 1999

[51] Int. Cl.[7] ............................................. B25B 23/02
[52] U.S. Cl. ............................................. 81/57.22; 81/57.36
[58] Field of Search ............................ 81/54–57, 57.14, 81/57.22, 57.28, 57.31, 57.32, 57.36, 462, 124.5, 180.1, DIG. 1

[56] References Cited

U.S. PATENT DOCUMENTS

| | | | |
|---|---|---|---|
| 2,069,882 | 2/1937 | Hall | 81/57 |
| 3,848,488 | 11/1974 | Weisenburger | 81/57.22 |
| 4,840,094 | 6/1989 | Macor | 81/185 |
| 5,074,170 | 12/1991 | Shirley | 81/57.3 |
| 5,157,995 | 10/1992 | Nogues | 81/124.5 |
| 5,163,344 | 11/1992 | Mathers | 81/124.5 |
| 5,277,085 | 1/1994 | Tanimura et al. | 81/57.22 |
| 5,595,251 | 1/1997 | Cook, Jr. | 173/178 |
| 5,647,254 | 7/1997 | Cook, Jr. | 81/475 |

*Primary Examiner*—James G. Smith
*Assistant Examiner*—David B. Thomas
*Attorney, Agent, or Firm*—Norman E. Lehrer

[57] ABSTRACT

A multi-lug nut driving device which facilitates the removal or application of a wheel from or to a vehicle is disclosed. The device includes a housing with a top and bottom, a main beveled gear located centrally within the housing and extending upwardly from the top of the housing. Slots are located on the top of the housing and extend radially outwardly from the main beveled gear and at least two smaller, beveled gears are located within each of the slots, where the teeth of the first one of the smaller gears mesh with the teeth of the main beveled gear and the teeth of the second smaller gear mesh with the teeth of the first smaller gear. The second gear also has a socket adapted to receive a lug nut of a wheel. Each socket has rings of concentric sockets located therein so that a wide variety of lug nuts may be received within the socket. Each socket ring also has multiple teeth so that the lug nuts may be gripped regardless of how they are oriented.

5 Claims, 3 Drawing Sheets

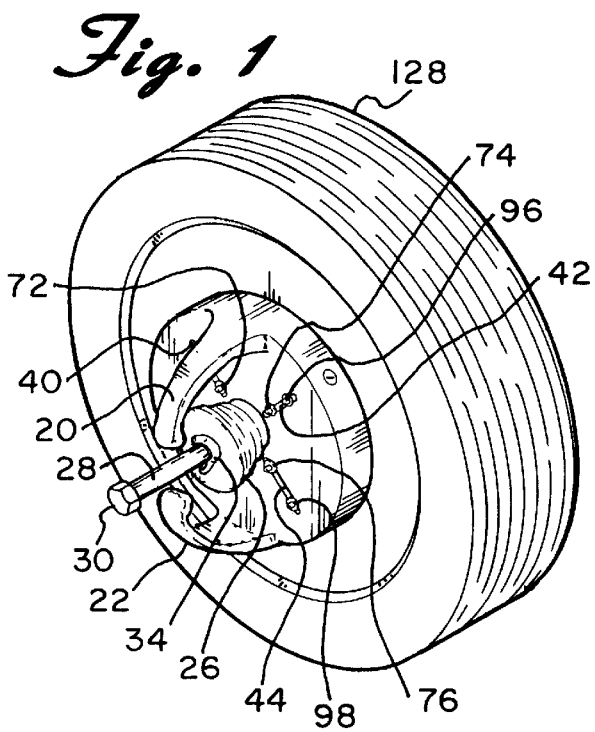
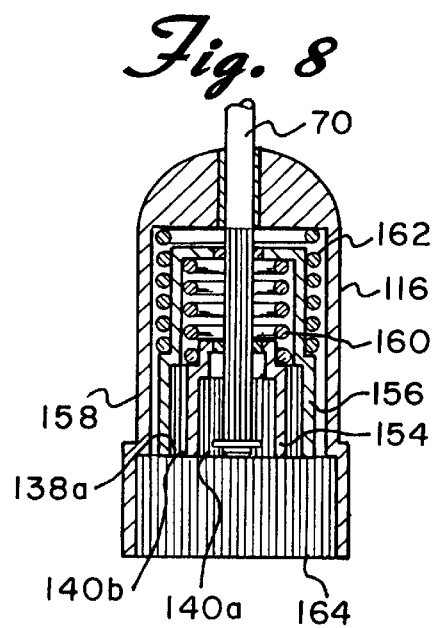
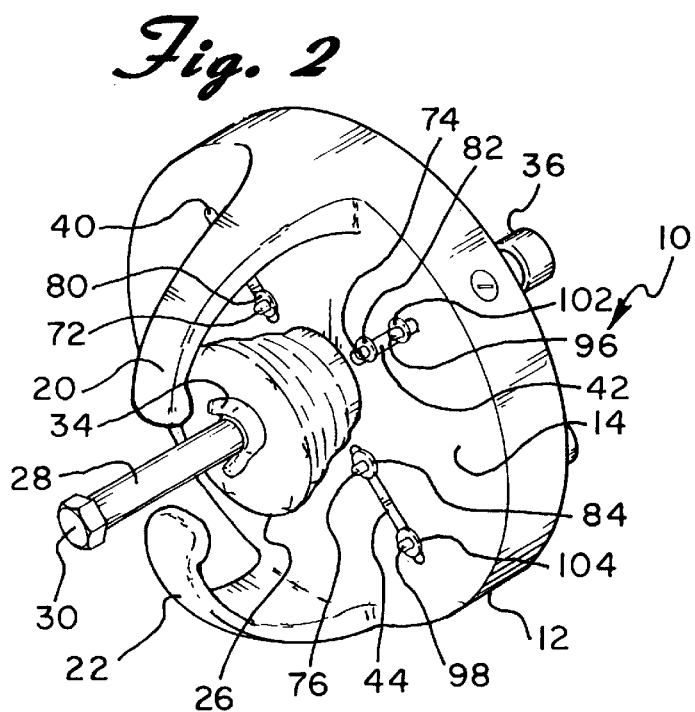
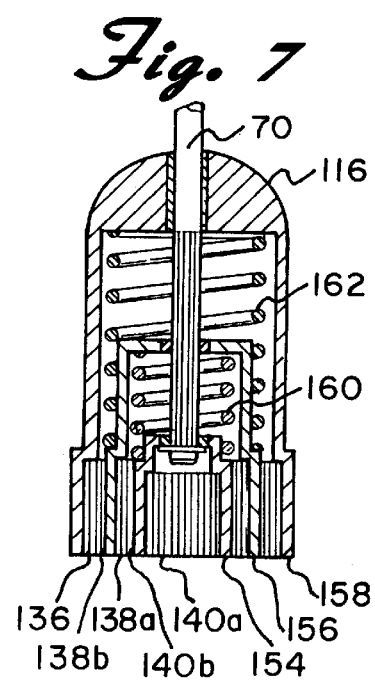

MULTI-LUG NUT DRIVING DEVICE

BACKGROUND OF THE INVENTION

The present invention is directed toward a multi-lug nut removal device and more particularly, toward a device for simultaneously removing all of the lugs nuts from the wheel of a vehicle in order to facilitate removing the wheel from the vehicle. The invention can, of course, also be used to subsequently resecure all of the lug nuts.

The removal of an automobile wheel is often a difficult and time-consuming procedure. Many devices are known which try to simplify this procedure. For example, U.S. Pat. No. 5,074,170 to Shirley discloses a lug nut tool with a central housing and a plurality of radially directed housing legs relative to the housing. Each leg mounts an output shaft driven through a central gear to effect simultaneous removal or assembly of lug nuts relative to the wheel. A central drive gear is mounted within the housing which has a central drive gear socket extending coaxially of and exteriorly of the top surface of the housing. The socket receives a drive tool which is mechanically, pneumatically, or hydraulically driven. This device, however, cannot be easily manipulated by the average person trying to remove a wheel from or reattach a wheel to a car or other vehicle.

U.S. Pat. No. 5,647,254 to Cook, Jr. discloses a multiple fastener device that may be used to simultaneously drive multiple fasteners for tightening or loosening them. Input torque is applied to a shaft and pinion. The pinion drives each output gear at the same rate to thereby torque multiple fasteners simultaneously. The input torque source may include a manual ratchet wrench, an electric drill, or a pneumatic motor. Coiled flexible drive shafts adjust to lateral movement of the output gears and have shaft connector members which are connected to flexible coiled fastener drive shafts. The drive shafts flex as required to adjust shaft length and orientation to compensate for movement of the output adapters. This patent also cannot be easily manipulated by the average person trying to remove a wheel from or resecure a wheel to a vehicle.

SUMMARY OF INVENTION

The present invention is designed to overcome the deficiencies of the prior art discussed above. It is an object of this invention to provide a multi-lug nut removal device which aids a person to remove the lug nuts of a wheel simultaneously so that the wheel may be removed from a vehicle.

It is another object of the invention to provide a device which aids a person in simultaneously securing the lug nuts of a wheel so that the wheel may be easily mounted on the vehicle.

It is yet another object of the present invention to provide an easily manipulated and versatile device so that a person may use the device without assistance from another person.

In accordance with the illustrative embodiments demonstrating features and advantages of the present invention, there is provided a multi-lug nut driving device which facilitates the removal or attachment of a wheel from or to a vehicle. The device includes a housing with a top and bottom, a main beveled gear located centrally within the housing and extending upwardly from the top of the housing. Slots are located on the top of the housing and extend radially outwardly from the main beveled gear to allow for radial movement of at least two smaller, beveled gears that are located within each of the slots, where the teeth of the first one of the smaller gears mesh with the teeth of the main beveled gear and the teeth of the second gear mesh with the teeth of the first, smaller gear. This allows for the device to be adaptable to a variety of different size wheels. The second gear also has a socket adapted to receive a lug nut of a wheel. Each socket has rings of concentric sockets located therein so that a wide variety of lug nuts may be received within the socket. Each socket ring also has multiple teeth so that the lug nuts may be gripped regardless of how they are oriented.

Other objects, features, and advantages of the invention will be readily apparent from the following detailed description of a preferred embodiment thereof taken in conjunction with the drawings. dr

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of the multi-lug nut driving device of the present invention attached to a wheel of a vehicle;

FIG. 2 is perspective view of the multi-lug nut driving device of the present invention similar to FIG. 1 but showing the same spaced from the wheel;

FIG. 7 is a cross-sectional view of a socket taken along line 7—7 of FIG. 4; and FIG. 8 is a cross-sectional view a socket with a lug nut engaged in the outermost socket ring.

DETAILED DESCRIPTION OF THE PREFERRED EMBODIMENT

Figure 3:
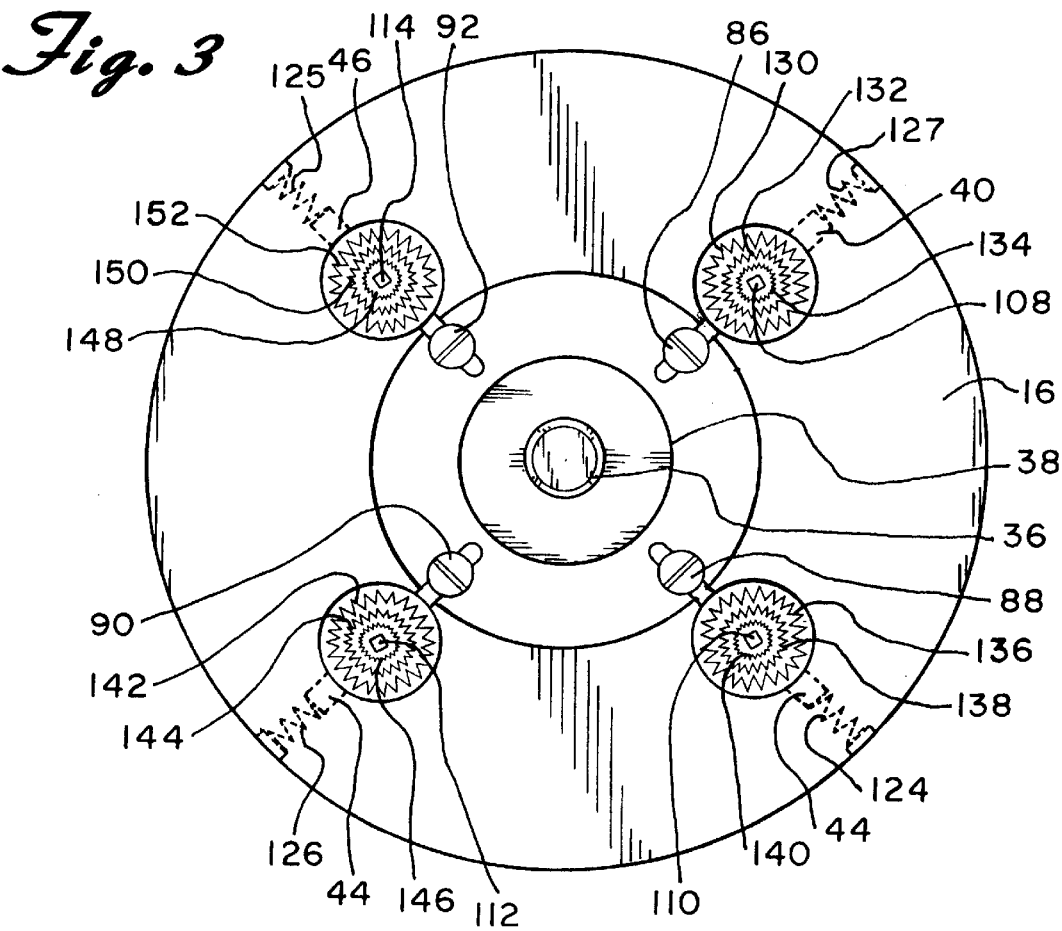
FIG. 3 is a bottom plan view of the multi-lug nut driving device of the present invention.

Referring now to the drawings in detail wherein like reference numerals have been used throughout the various figures to designate like elements, there is shown in FIG. 2 a multi-lug nut driving device constructed in accordance with the principles of the present invention and designated generally as 10.

The multi-lug nut driving device 10 of the present invention essentially includes a generally circular housing 12 with a top 14 and a bottom 16, a beveled main gear 18 centrally located within the housing 12 and extending upwardly from the top 14 of the housing 12, and handles 20 and 22 located on the top 14 of the housing 12 and extending upwardly. The housing 12 may be made from metal or strong rigid plastic or any other type of material generally known and used in the art. The beveled gear 18 has teeth 24, for example, around the periphery thereof and is protected by a flexible boot or cover 26.

Extending upwardly and through the center of the beveled gear 18 is a threaded axle or shaft 28 to which the beveled gear 18 is keyed so that they must rotate together. The shaft 28 has a head 30, threads 32, and a nut 34 attached thereto.

The beveled gear 18 and shaft 28 are rotatable together but the gear 18 may move up and down axially with respect to the shaft 28. That is, when nut 34 is loosened or tightened, the beveled gear 18 moves axially up or down the shaft 28. Located at the bottom 36 of the shaft 28 is a bushing 38 which supports the shaft 28 and allows the same to rotate. Bushing 38 may be attached to the housing 12 in any manner known in the art. For example, bushing 38 may be bolted or welded onto the bottom 16 of the housing 12.

Figure 5:
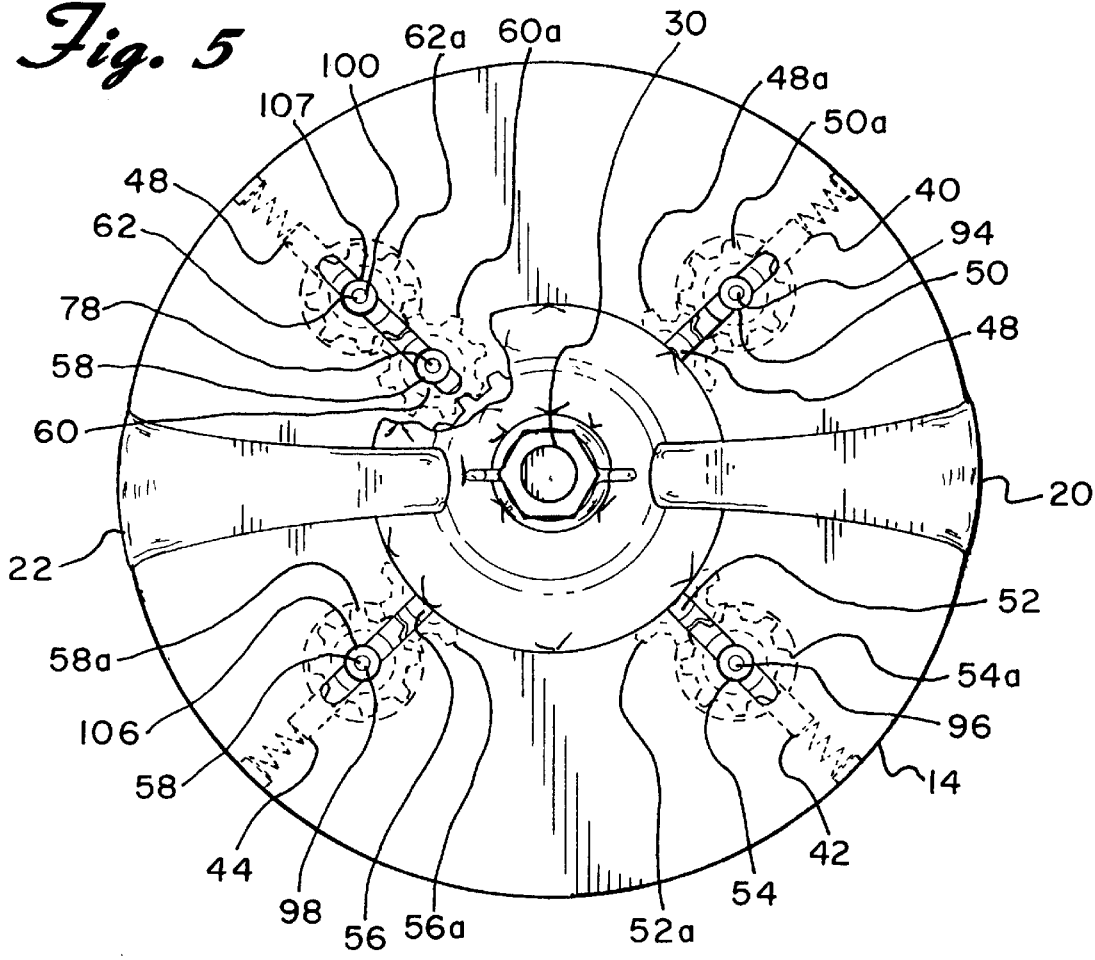
FIG. 5 is a top plan view of the multi-lug nut driving device of the present invention with portions broken away for clarity.

Spaced around the beveled gear 18 and on the top 14 of the housing are four slots 40, 42, 44, and 46 extending radially outwardly from the beveled gear 18. (See FIG. 5.) Riding in slot 40 are two smaller, beveled gears 48 and 50. Likewise, smaller, beveled gears 52 and 54 ride in slot 42; gears 56 and 58 ride in slot 44; and gears 60 and 62 ride in slot 46. While only four slots are shown, it should be realized that any number of slots may be used, depending upon the number of lug nuts that the device is intended to be used with. The majority of passenger vehicles use four or five lug nuts and, therefore, the invention would be made with either four or five slots. Commercial vehicles may, however, require more slots as some may have six or eight lug nuts on each wheel.

In the preferred embodiment, the first of the smaller gears 48, 52, 56, and 60 are located next to the beveled gear 18 so that the teeth 48a, 52a, 56a, and 60a of the first gears 48, 52, 56, and 60, respectively, mesh or engage with teeth 24 of the main beveled gear 18. The second of the smaller gears 50, 54, 58, and 62 are located outwardly from but next to first gears 48, 52, 56, and 60, respectively. The teeth 48a, 52a, 56a, and 60a of the first gears mesh with the teeth 50a, 54a, 58a, and 62a, respectively, of the second gears. (See FIG. 5.)

Each of the smaller gears has an axle or shaft 64, 66, 68, and 70, for example, to which it is keyed. (See, for example, FIG. 4.) Each of the shafts of the first gears has a first end 72, 74, 76, and 78 with a bushing 80, 82, 84, and 85, respectively, secured thereto. Each of the first set of shafts also has a second end 86, 88, 90, and 92, respectively. Each of shafts of the second gears has a first end 94, 96, 98, and 100 with a bushing 102, 104, 106, and 107, respectively secured thereto. Each of the second set of shafts also has a second end 108, 110, 112, and 114, respectively.

Each second end of the second set of shafts has a socket 116 and 118, for example, attached thereto where the sockets 116 and 118 are biased downwardly by springs 120 and 122, respectively. (While only two sockets have been shown, it should be realized that each second gear has a socket associated therewith.) This allows for upward and downward movement of the socket, as will be discussed in more detail below. The second gears are also biased inwardly by springs 124, 125, 126, and 127, thereby allowing for inward and outward movement of the smaller gears.

Figure 4:
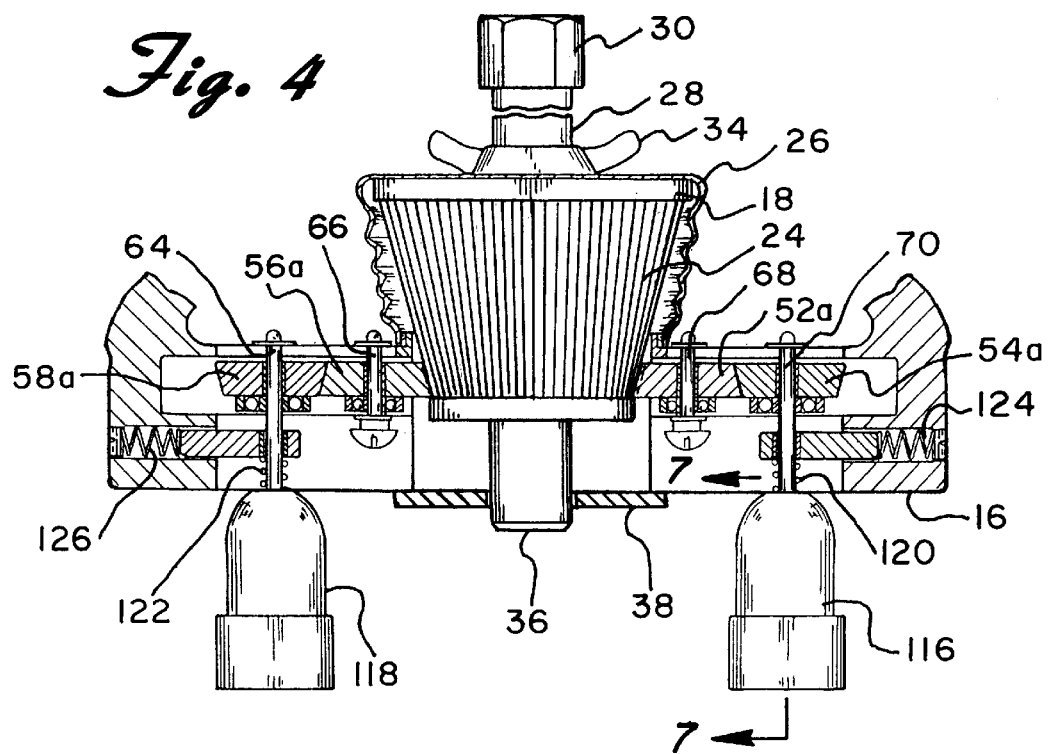
FIG. 4 is a partial cross-sectional view of the multi-lug nut driving device of the present invention with the main gear in its upwardmost position.
Figure 6:
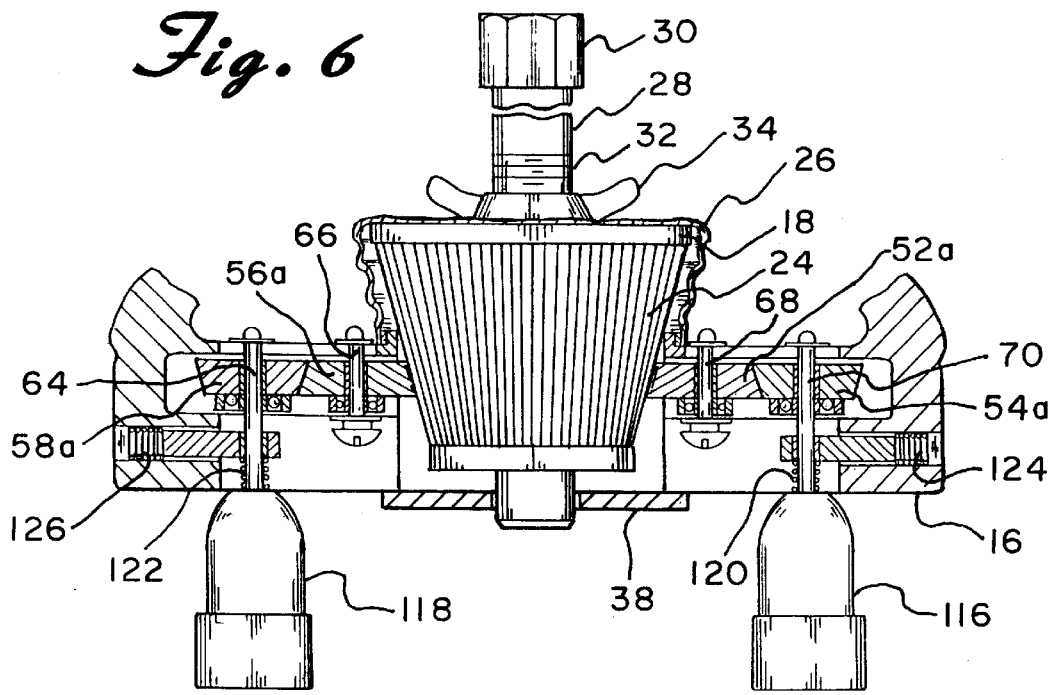
FIG. 6 is partial cross-sectional view similar to FIG. 4 with the main gear in a downward position.

In order to adjust the device to fit a particular wheel, nut 34 may be tightened which, in turn, moves the beveled gear 18 downwardly. The movement of the beveled gear 18 downwardly causes first gears 48, 52, 56, and 60 and second gears 50, 54, 58, and 62 to move outwardly. That is, as the beveled gear 18 is moved downwardly, springs 124, 125, 126, and 127 are compressed, thereby allowing the first gears 48, 52, 56, and 60 and second gears 50, 54, 58, and 62 to move outwardly. (See FIG. 6.) In this manner, the sockets of the device may be adjusted to fit the lug nuts of a wheel however far apart the lug nuts may be located from each other. Likewise, if the lug nuts are spaced closer together, nut 34 may be loosened so that it is at its topmost position, as seen in FIG. 4. In this case, beveled gear 18 is in its upwardmost position. Accordingly, springs 124, 125, 126, and 127 bias first gears 48, 52, 56, and 60 and second gears 50, 54, 58, and 62 inwardly so that the first and second gears are in their respect inmost positions.

A further aspect of the present invention is seen in FIG. 3. Because lug nuts may be oriented in a wide variety of ways when they are attached to a wheel, it would be difficult to individually align each socket to receive its respective lug nut. With the present invention each of the sockets has multiple teeth. For example, socket 116 of second gear 54 has multiple teeth 136, 138, and 140 and socket 118 of second gear 58 has multiple teeth 142, 144, and 146. Similarly, the socket of second gear 50 has multiple teeth 130, 132, and 134, and the socket of second gear 62 has multiple teeth 148, 150, and 152. That is, instead of the sockets having a generally hexagonal set of teeth, where each socket would have to be aligned with its respective lug nut, each socket has a plurality of teeth, providing a number of grips so that each lug nut may be gripped without having to individually adjust each socket to fit its respective lug nut.

In another aspect of the present invention, each socket has an inner, middle, and outer socket in order to fit a number of sizes of lug nuts. (See FIGS. 3, 7, and 8.) Using socket 116 to illustrate, socket 116 is shown with an inner socket 154, a middle socket 156, and an outer socket 158 where the sockets form concentric rings. (See FIG. 7.) The inner socket 154 has an inner set of multiple teeth 140a and an outer set of multiple teeth 140b and is biased downwardly by spring 160. Likewise, middle socket 156 has an inner set of multiple teeth 138a and an outer set of multiple teeth 138b and is biased downwardly by spring 162. Outer socket 158 has only an inner set of teeth 136. (See FIG. 3.) The outer set of teeth 140b of the inner ring 154 mesh with the inner set of teeth 138a of the middle ring 156 and the outer set 138b of teeth of the middle ring 156 mesh with the teeth 136 of the outer ring 158. (See FIG. 7.)

Turning to FIG. 8, a lug nut 164 is shown fit into the outer ring 158 of the socket 116. When the lug nut 164 is inserted into the socket 116, spring 120 is biased upwardly. Because of the size of the particular lug nut 164, inner socket 154 inner and middle socket 156 are forced upwardly with spring 160 being biased upwardly, inner socket 154 is forced within the middle socket 156, spring 162 being biased upwardly, and the outer set of teeth 140b of the inner ring 154 meshing with the inner set of teeth 138a of the middle ring 156. The multiple teeth 136 of the outer ring 158 grip the lug nut 164 and keep the lug nut 164 in the proper position.

Similarly, the lug nut may be of a smaller size so that it engages the inner set of multiple teeth 138a of middle ring 156. In this case, spring 160 will be biased upwardly, the inner ring 154 will be forced upwardly, and the outer set of teeth 138b of middle ring 156 mesh with teeth 136 of the outer ring 158. If the lug nut is smaller yet, the lug nut will be engaged by the inner set of multiple teeth 140a of the inner ring 154, the outer set of teeth 140b of the inner ring 154 will engage the inner set of teeth 138a of the middle ring 156 and the outer set 138b of teeth of the middle ring 156 engage the inner set of teeth 136 of the outer ring 158.

Once the lug nuts have been properly positioned within the sockets of the device, that is, the lug nuts are properly positioned within the appropriate inner, middle, or outer rings and the multiple teeth of the sockets are properly gripping the lug nuts, the device is firmly secured to the lug nuts of a wheel, as seen, for example, in FIG. 1. Beveled gear 18 and shaft 28 may now be rotated. Rotating the beveled gear 18 rotates first gears 48, 52, 56, and 60, which in turn, rotate second gears 50, 54, 58, and 62, thereby loosening the lug nuts simultaneously. Obviously the lug nuts are tightened by simply reversing the above procedure. The mechanism by which the beveled gear 18 is driven may be attached to the shaft 28 and powered by any electric, pneumatic, or hydraulic means well known and used in the art.

When utilizing the present device to simultaneously tighten a plurality of lug nuts, the situation could arise wherein one of the lug nuts may be fully tightened before the others are in their final position. This could result in the additional lug nuts not being fully tightened since the gears of the multi-lug nut device 10 would stop rotating once the first lug nut was tightened. In order to prevent such a problem, each of the socket mechanisms 116, 118 etc. could be provided with a clutch mechanism. This can be provided either at or near the socket or as part of the gears or shafts utilized to drive the sockets. Such clutches are well known in the art and are commonly employed with pneumatic drivers currently used by mechanics when tightening a single lug nut. These clutches are also normally adjustable so that different torquing forces can be selected.

The present invention may be embodied in other specific forms without departing from the spirit or essential attributes thereof and accordingly, reference should be made to the appended claims rather than to the foregoing specification as indicating the scope of the invention. By way of example and not limitation, there may be situations when the various beveled gears may not properly mesh with each other because of the sizes and shapes of the gear teeth. That is, the teeth 24 on the beveled gear 18 may be closer to each other adjacent the bottom thereof than at the top. To avoid this problem, the beveled gear 18 and the first set of smaller gears could be semi-spherically shaped and arranged in inverse directions. This would allow the gears to mesh as they are moved along their circumferences toward and away from each other.

I claim:

1. A multi-lug nut driving device used to simultaneously remove or secure lug nuts from or to a wheel comprising:

a housing having a top and a bottom;

a main beveled gear located centrally within said housing and extending upwardly from said top of said housing;

a plurality of slots located on said top of said housing extending radially outwardly from said main beveled gear;

at least two beveled gears located beneath each of said slots and being rotatably mounted on axles extending within said slots, one of each of said beveled gears meshing with said main beveled gear and the other of each of said beveled gears having a socket adapted to receive a lug nut of a wheel, each of said beveled gears and its respective axle being radially moveable with said axles being guided within said slots, and means biasing each of said axles, beveled gears and sockets inwardly toward said main beveled gear.

2. The multi-lug driving device of claim 1 wherein said socket is spring biased downwardly.

3. The multi-lug driving device of claim 2 wherein said socket has concentric rings of sockets located therein.

4. The multi-lug driving device of claim 3 wherein each of said rings has multiple teeth.

5. The multi-lug driving device of claim 4 wherein there are at least two of said rings and each of said two rings has an inner set of multiple teeth and an outer set of multiple teeth.

\* \* \* \* \*